United States Patent
Khare et al.

(10) Patent No.: US 12,095,795 B2
(45) Date of Patent: Sep. 17, 2024

(54) FAILURE-TOLERANT SYSTEM AND METHOD FOR ESTABLISHING CONSENSUS AMONG BLOCKS WITHIN A BLOCKCHAIN NETWORK

(71) Applicant: Bank of America Corporation, Charlotte, NC (US)

(72) Inventors: Prashant Khare, Mumbai (IN); Pranav Kaul, Gurugram (IN); Maisnam Ricky, Delhi (IN); Neha Trehan, Pradesh (IN)

(73) Assignee: Bank of America Corporation, Charlotte, NC (US)

( * ) Notice: Subject to any disclaimer, the term of this patent is extended or adjusted under 35 U.S.C. 154(b) by 252 days.

(21) Appl. No.: 17/842,369

(22) Filed: Jun. 16, 2022

(65) Prior Publication Data

US 2023/0412621 A1    Dec. 21, 2023

(51) Int. Cl.
*H04L 9/40* (2022.01)

(52) U.S. Cl.
CPC .............................. *H04L 63/1425* (2013.01)

(58) Field of Classification Search
CPC .................................................. H04L 63/1425
See application file for complete search history.

(56) References Cited

U.S. PATENT DOCUMENTS

| | | |
|---|---|---|
| 7,974,221 B2 | 7/2011 | Tamassia et al. |
| 8,312,356 B1 | 11/2012 | Cousins |
| 8,917,628 B2 | 12/2014 | Steiner et al. |
| 9,143,392 B2 | 9/2015 | Duchesneau |
| 9,680,508 B1 | 6/2017 | Cousins |
| 9,813,445 B2 | 11/2017 | Glew et al. |
| 10,163,091 B1 | 12/2018 | Vijayvergia et al. |
| 10,169,135 B1 * | 1/2019 | Pandey .............. G05B 23/0283 |
| 10,503,614 B2 | 12/2019 | Abraham et al. |
| 10,664,353 B2 | 5/2020 | Karame et al. |
| 2016/0277441 A1 * | 9/2016 | Glew ...................... G06F 21/56 |
| 2017/0103399 A1 | 4/2017 | Napsky et al. |
| 2019/0354518 A1 | 11/2019 | Zochowski |
| 2019/0361842 A1 | 11/2019 | Wood et al. |
| 2019/0385215 A1 | 12/2019 | Ferenczi et al. |
| 2020/0026699 A1 | 1/2020 | Zhang et al. |

(Continued)

FOREIGN PATENT DOCUMENTS

EP    3461059 B1    7/2020

*Primary Examiner* — Ayoub Alata

(57) ABSTRACT

A system communicates a request to a plurality of network nodes to provide user information associated with a document. The system receives a plurality of log files that comprises data communications among the network nodes and responses to the request. The system determines a first number of network nodes that are associated with a first anomaly from the plurality of log files. The system determines a second number of network nodes that are associated with a second anomaly from the plurality of log files. The system determines the number of malicious network nodes by combining the first number and the second number of network nodes. If the system determines that the number of malicious network nodes exceeds a threshold percentage, it assigns one or more network nodes to store the user information until the number of malicious network nodes is less than the threshold percentage.

17 Claims, 5 Drawing Sheets

(56) References Cited

U.S. PATENT DOCUMENTS

| | | |
|---|---|---|
| 2020/0042960 A1 | 2/2020 | Cook et al. |
| 2020/0073560 A1 | 3/2020 | Adanve |
| 2020/0111092 A1 | 4/2020 | Wood et al. |
| 2020/0159697 A1 | 5/2020 | Wood et al. |
| 2020/0204346 A1* | 6/2020 | Trevethan ............. H04L 9/3236 |
| 2020/0211003 A1 | 7/2020 | Fletcher |
| 2020/0226242 A1 | 7/2020 | Balaraman et al. |
| 2020/0374300 A1 | 11/2020 | Manevich et al. |
| 2020/0374301 A1 | 11/2020 | Manevich et al. |
| 2020/0380154 A1 | 12/2020 | Jayachandran |
| 2020/0382310 A1 | 12/2020 | Jayachandran |
| 2020/0394183 A1 | 12/2020 | Jois |
| 2021/0073212 A1 | 3/2021 | Conley et al. |
| 2021/0119767 A1 | 4/2021 | Fletcher et al. |
| 2021/0126800 A1 | 4/2021 | De La Rocha Gmez-Arevalillo et al. |
| 2021/0168163 A1* | 6/2021 | Meshi ................... H04L 63/145 |
| 2021/0318896 A1 | 10/2021 | Liu |
| 2022/0173885 A1* | 6/2022 | Behl ....................... H04L 9/002 |

* cited by examiner

FAILURE-TOLERANT SYSTEM AND METHOD FOR ESTABLISHING CONSENSUS AMONG BLOCKS WITHIN A BLOCKCHAIN NETWORK

TECHNICAL FIELD

The present disclosure relates generally to information security, and more specifically to a failure-tolerant system and method for establishing consensus among blocks within a blockchain network.

BACKGROUND

Confidential information associated with users may be included or presented on documents. Regardless of whether the document is a digital file or a physical file, it is vulnerable to unauthorized access by bad actors through theft, cyberattack, etc. If such unauthorized access to documents is left undetected, the bad actors can exfiltrate the confidential information associated with users. It is challenging to determine the validity of the information presented in a document.

SUMMARY

The system described in the present application provides several practical applications and technical advantages that overcome the current technical problems described herein. The following disclosure is particularly integrated into a practical application of validating user information presented on a document associated with a user. This, in turn, provides an additional practical application of protecting confidential information associated with the user from unauthorized access. Accordingly, the disclosed system provides an additional practical application of improving information security technology. The disclosed system is further integrated into a practical application of providing a fault-tolerant technology for determining a validity of a document even when anomalies and failures are detected in one or more network nodes that serve to determine the validity of the document. These practical applications and technical advantages are described below.
Determining the Validity of a Document Based on Information Extracted from the Document The disclosed system contemplates a system and a method for determining the validity of a document based on information extracted from the document. The disclosed system may be configured to determine whether a document is valid or invalid based on determining whether the information presented on the document corresponds to expected information. This technology may be employed in verifying and validating any kind of document. For example, a document may include confidential information and/or can be used to access confidential information associated with a user. Thus, if a bad actor via unauthorized access becomes able to access the information on the document, the bad actor may use the document to gain unauthorized access to confidential information associated with the user. In other words, if such unauthorized access to the documents is left undetected, confidential information (presented on the document and/or that can be accessed via the document), becomes vulnerable to exposure and unauthorized access. Thus, the present disclosure provides improved information security for confidential information associated with users that either present on the document and/or can be accessed via the document. Accordingly, the disclosed system is integrated into a practical application of protecting confidential information from unauthorized access by bad actors by improving the information security technology and network security technology.

In one embodiment, a system of document verification comprises a network interface and a processor. The network interface is configured to receive a scan of a document that presents first user information associated with a first user, where the first user information comprises at least one of a first name, a first address, and a first number associated with the first user. The processor is operably coupled with the network interface. The processor accesses the scan of the document. The processor extracts the first user information from the scan of the document. The processor identifies an entity associated with the document, where an identifier associated with the entity is shown on the scan of the document. The processor communicates, to a first computing device associated with the entity, a request indicating to provide second user information associated with the first user, where the second user information comprises at least one of a second name, a second address, and a second number associated with the first user. The processor receives a response comprising the second user information from the first computing device. The processor compares each component in the first user information with a counterpart component in the second user information. The components in the first user information comprise the at least one of the first name, the first address, and the first number. The components in the second user information comprise the at least one of the second name, the second address, and the second number associated with the first user. The processor determines a percentage of components in the first user information that corresponds to the counterpart components in the second user information. The processor compares the percentage of components in the first user information against a threshold percentage. The processor determines the validity of the document based at least in part upon the comparison between the first user information and the second user information.
Detecting Malicious Network Nodes and Establishing Consensus Among Network Nodes Regarding the Validity of a Document The disclosed system further contemplates a system and a method for detecting malicious network nodes and establishing consensus among network nodes regarding the validity of a document. The disclosed system may be configured to provide a fault-tolerant technology for determining whether consensus (e.g., regarding the validity of a document) is established among network nodes (e.g., blocks in a blockchain network). For example, the disclosed system may be configured to determine whether there are any anomalies associated with any of the blocks or network nodes. The anomalies may include a network node not being responsive, a block not being responsive, and information missing from requested user information, among others. The disclosed system determines the number of network nodes that are associated with one or more anomalies from among the total number of network nodes. The disclosed system determines whether the number of network nodes that have corresponding or matching user information (e.g., network nodes without anomalies) is more than the required minimum number of network nodes (e.g., 30% of total network nodes, or any other threshold percentage) to establish consensus among the network nodes.

If the number of network nodes without anomalies is more than or equal to the required minimum number of network nodes, the disclosed system determines that consensus regarding the validity of the document is established among the network nodes. Otherwise, the disclosed system generates one or more network nodes in the distributed network and replicates the correct user information in the generated network nodes until the number of network nodes without anomalies is more than or equal to the required minimum number of network nodes so that the consensus among the network nodes regarding the validity of the document is reached. Accordingly, the disclosed system is integrated into a practical application of providing a fault-tolerant technology for determining a validity of a document even when there are anomalies and failures detected in one or more network nodes that serve to determine the validity of the document.

In one embodiment, a fault-tolerant system for establishing consensus among network nodes within a distributed network comprises a network interface and a processor. The network interface is configured to communicate a request to a plurality of network nodes within a distributed network to provide user information associated with a document, where the user information comprises at least one of a name, an address, or a serial number associated with a user. The processor is operably coupled with the network interface. The processor receives, from the plurality of network nodes, a plurality of log files, where the plurality of log files comprises data communications among the plurality of network nodes and responses to the request. The processor determines, from the plurality of log files, a first number of network nodes from among the plurality of network nodes that are associated with a first anomaly, where the first anomaly comprises an indication that a network node is unresponsive to the request. The processor determines, from the plurality of log files, a second number of network nodes from among the plurality of network nodes that are associated with a second anomaly, where the second anomaly comprises an indication that a consensus regarding the user information is not met among the plurality of network nodes, where the consensus regarding the user information indicates that a common agreement among the plurality of network nodes is reached that the user information received from the plurality of network nodes correspond to one another. The processor determines a number of malicious network nodes by combining the first number of network nodes and the second number of network nodes. The processor compares the number of malicious network nodes with a threshold percentage of network nodes, where the threshold percentage of network nodes is the minimum required number of network nodes that are needed to establish the consensus regarding the user information among the plurality of network nodes. The processor determines that the number of malicious network nodes exceeds the threshold percentage of network nodes. In response to determining that the number of malicious network nodes exceeds the threshold percentage of network nodes, the processor determines that the consensus regarding the user information is not met. The processor assigns one or more new network nodes within the distributed network to store the user information until the number of malicious network nodes is less than the threshold percentage of network nodes.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to provide a reliable solution for determining a validity of a document and detecting malicious network nodes. Embodiments of the present disclosure and its advantages may be understood by referring to FIGS. 1 through 5. FIGS. 1 through 5 are used to describe a system and method for determining a validity of a document, and a system and method for detecting malicious network nodes.

System Overview

Figure 1:
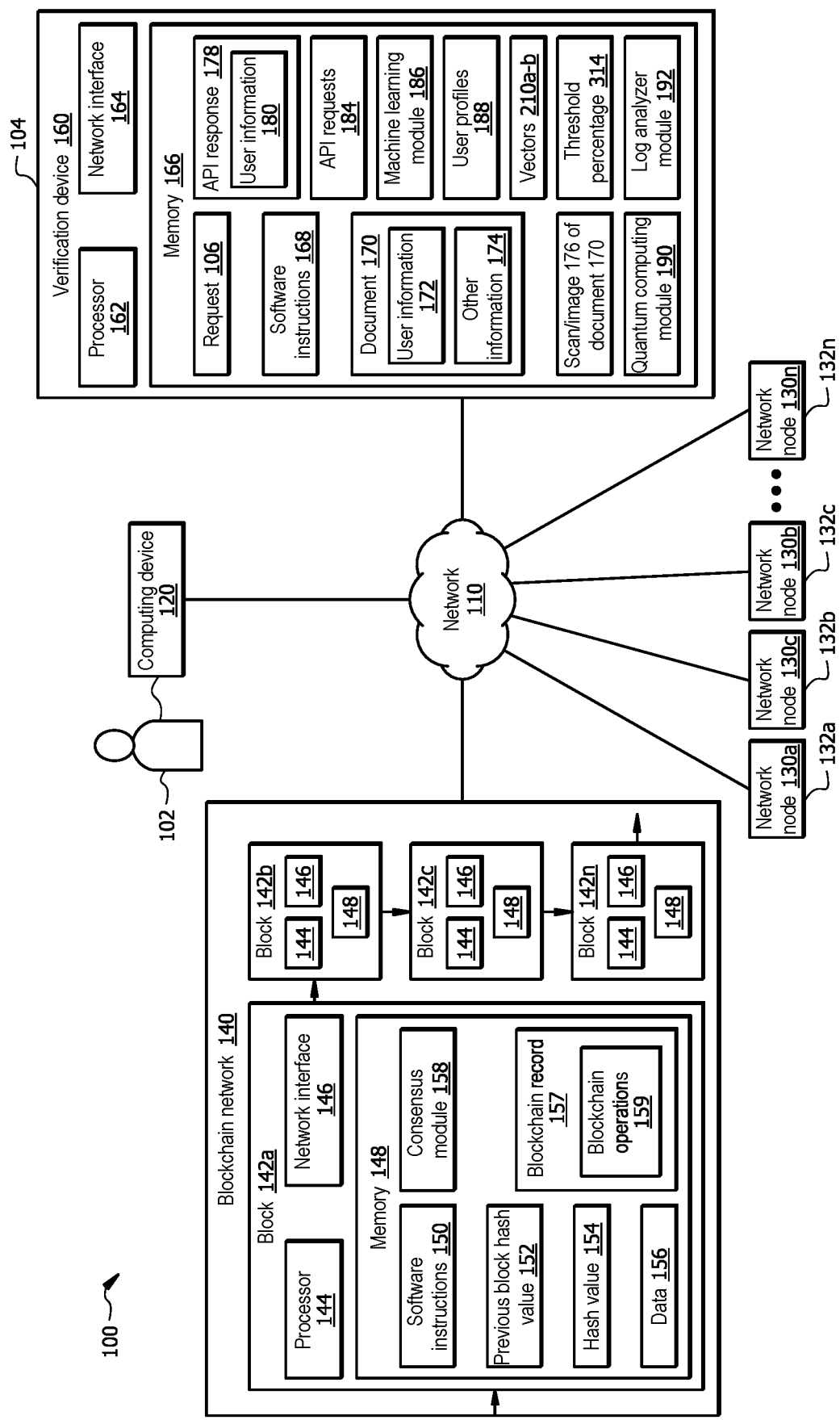
FIG. 1 illustrates an embodiment of a system configured to determine a validity of a document and detecting malicious network nodes.

FIG. 1 illustrates an embodiment of a system 100 that is generally configured to determine a validity of a document 170 (e.g., at the time of receiving the document 170) and detect malicious network nodes 130. In certain embodiments, the system 100 comprises a verification device 160 in signal communication and operably coupled with a computing device 120, one or more network nodes 130 (e.g., network nodes 130a-n), and a blockchain network 140 via a network 110. Network 110 enables communication between the components of the system 100. Verification device 160 comprises a processor 162 in signal communication with a memory 166. Memory 166 stores software instructions 168 that when executed by the processor 162 cause the verification device 160 (e.g., via the processor 162) to perform one or more operations described herein. For example, when the software instructions 168 are executed, the verification device 160 determines the validity of a document 170. In other embodiments, system 100 may not have all of the components listed and/or may have other elements instead of, or in addition to, those listed above.

System 100 may be configured to determine whether a document 170 is valid or invalid based on determining whether the information presented on the document 170 corresponds to expected information. This technology may be employed in verifying and validating any kind of document 170. For example, a document 170 may include confidential information and/or can be used to access confidential information associated with a user 102. Thus, if a bad actor via unauthorized access becomes able to access the information on the document 170, the bad actor may use the document 170 to gain unauthorized access to confidential information associated with the user 102. In other words, if such unauthorized access to documents 170 is left undetected, confidential information (presented on the document 170 and/or that can be accessed via the document 170), becomes vulnerable to exposure and unauthorized access. Thus, the technology disclosed in the present disclosure provides improved information security for confidential information associated with users 102 that either present on the document 170 and/or can be accessed via the document 170. This process is described in greater detail in FIGS. 2 and 4. Accordingly, system 100 is integrated into a practical application of protecting confidential information from unauthorized access by bad actors by improving the information security technology and network security technology.

System 100 may further be configured to provide a fault-tolerant technology for detecting malicious network nodes 130 and determining whether consensus (e.g., regarding the validity of a document 170) is established among network nodes 130 and/or blocks 142. For example, the system 100 is configured to determine whether there are any anomalies 312 associated with any of the network nodes 130 and/or blocks 142. The anomalies 312 may include a network node 130 not being responsive, a block 142 not being responsive, information missing from requested user information 180, among others. The system 100 determines the number of network nodes 130 that are associated with one or more anomalies 312 from among the total number of network nodes 130. The system 100 determines whether the number of network nodes 130 that have corresponding or matching user information 180 (i.e., network nodes 130 without anomalies) to validate the document 170 is more than the required minimum number of network nodes 130 (e.g., 30% of total network nodes 130, or any other threshold percentage) to establish consensus among the network nodes 130 and/or blocks 142. If the number of network nodes 130 without anomalies 312 is more than or equal to the required minimum (or threshold) number of network nodes 130, the system 100 determines that consensus regarding the validity of the document 170 is established among the network nodes 130 and blocks 142. Otherwise, system 100 assigns one or more network nodes 130 to store the correct user information until the number of network nodes 130 without anomalies 312 is more than or equal to the required minimum (or threshold) number 314 of network nodes 130 to reach the consensus among the network nodes 130 regarding the validity of the document 170. This process is described in greater detail in FIGS. 3 and 5. Accordingly, system 100 is integrated into a practical application of providing a fault-tolerant technology for determining a validity of a document 170 even when there are anomalies and failures (collectively referred to herein as anomalies 312) are detected in one or more network nodes 130 and blocks 142 that serve to determine the validity of the document 170. In certain embodiments, system 100 is configured to implement a real-time (or approximately real-time) document 170 verification at the point of receiving (e.g., presentment of) the document 170 through fault-tolerant network.

System Components

Network

Network 110 may be any suitable type of wireless and/or wired network. The network 110 is not connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network that is not connected to the Internet. The network 110 may be configured to support any suitable type of communication protocol as would be appreciated by one of ordinary skill in the art.

Computing Device

Computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), or any other suitable type of device. In other examples, the computing device 120 may include a terminal or a kiosk associated with an organization 104.

The computing device 120 may include a user interface, such as a display, a microphone, keypad, or other appropriate terminal equipment usable by user 102. The computing device 120 may include a hardware processor, memory, and/or circuitry (not explicitly shown) configured to perform any of the functions or actions of the computing device 120 described herein. For example, a software application designed using software code may be stored in the memory and executed by the processor to perform the functions of the computing device 120. The computing device 120 is configured to communicate with other devices via the network 110, such as the verification device 160.

The computing device 120 may be configured to receive a document 170 from a user 102. For example, in case the computing device 120 is a smart phone, the user 102 may capture an image 176 of the document 170 using a camera associated with the computing device 120. In another example, in case the computing device 120 is a kiosk, the user 102 may present a physical document 170 to the kiosk, the computing device 120 may capture a scan 176 or an image of the document 170 using a camera, a scanner, and/or the like. The computing device 120 transmits the image or scan 176 of the document 170 to the verification device 160. The user 102 may be associated with and/or member of the organization 104 that provides services and/or products to its users. In the present disclosure, the scan 176 may be interchangeably referred to as an image 176.

Network Node

Each of the network nodes 130a-n is an instance of a network node 130. Network node 130 is generally any hardware computing device that is configured to process data, such as the document 170. Examples of the network node 130 include, but are not limited to, a personal computer, a desktop computer, a workstation, a server, a virtual machine, and the like. The network node 130 may include a hardware processor, memory, and/or circuitry (not explicitly shown) configured to perform any of the functions or actions of the network node 130 described herein. For example, a software application designed using software code may be stored in the memory and executed by the processor to perform the functions of the network node 130. The network node 130 is configured to communicate with other devices via the network 110.

Each network node 130 is associated with an entity 132. The entity 132 may be an organization. The network node 130a is associated with an entity 132a. The network node 130b is associated with an entity 132b. The network node 130c is associated with an entity 132c. The network node 130n is associated with an entity 132n. Each network node 130 may be a LAN server or a WAN server associated with the respective entity 132. Each network node 130 may be associated with and/or in signal communication with a respective block 142 in the blockchain network 140. For example, the network node 130a may be associated with the block 142a, network node 130b may be associated with the block 142b, network node 130b may be associated with the block 142b, and network node 130n may be associated with the block 142n. For example, a block 142 may store information related to its respective network node 130 and entity 132. In another example, a block 142 may store information about a document 170 and a request to determine its validity.

In certain embodiments, the block 142 and its respective network node 130 may be implemented in separate devices, as illustrated in FIG. 1. In certain embodiments, the block 142 and its respective network node 130 may be integrated into a single device.

When the verification device 160 is requested to determine the validity of a document 170 associated with a user 102, it may send Application Programming Interface (API) request 184 to a network node 130 associated with an entity 132 that is associated and/or presented on the document 170. The API request 184 may indicate to provide user information associated with the user 102.

In certain embodiments, the verification device 160 may send one or more API requests 184 to one or more network nodes 130 to provide user information associated with the user 102. The verification device 160 may receive the user information 180, and use this information in determining whether the document 170 is valid or invalid. This process is described in greater details in FIG. 2.

Blockchain Network

Blockchain network 140 comprises a cloud of computer systems (referred to herein as blocks 142) and is generally configured to keep records of blockchain record 157 and any other data, communications and interactions among the blocks 142, and the blockchain operations 159. A blockchain operation 159 may be a blockchain transaction. The blockchain network 140 may comprise any number of blocks 142. Each block 142 may comprise a computing device, a virtual machine, and/or the like. In certain embodiments, a block 142 may be associated with a network node 130.

In the present disclosure, a block 142 may interchangeably be referred to as a network node, a node, or a network device. The blockchain network 140 generally refers to a distributed database (e.g., distributed record 157) shared between a plurality of blocks 142 in a network. The system 100 may employ any suitable number of devices (e.g., blocks 142) to form a distributed network that maintains the blocks in form of a blockchain. The blockchain links together the blocks 142 of data which may include the blockchain record 157.

Each block 142 comprises a blockchain record 157 (e.g., stored in the memory 148) that is configured to store a copy of the blockchain 140 (not explicitly shown), which contains every blockchain operation 159 executed in the network and any other data. The blockchain 140 links together blocks 142 of data which comprise identifiable units called blockchain operations 159. Blockchain operations 159 may comprise information, files, or any other suitable type of data, such as data associated with digital documents, documents 170, user information, timestamps of API requests 184, timestamps of API responses 178, timestamps of requests 106, and any other type of information.

Each block 142 in the blockchain 140 comprises a hash value 154 and information derived from a preceding block 142. For example, every block 142 in the blockchain 140 includes a hash 152 of the previous block 142. By including the hash 152, the blockchain 140 comprises a chain of blocks 142 from a genesis block 142 to the current block 142. Each block 142 is guaranteed to come after the previous block 142 chronologically because the previous block's hash 152 would otherwise not be known. In one embodiment, blocks 142 in a blockchain 140 may be linked together by identifying a preceding block 142 with a cryptographic checksum (e.g., secure hash algorithm (SHA)-256) of its contents (e.g., blockchain records 157, and additional metadata stored in the memory 148) which serves as each block's unique identifier. Links are formed by storing the cryptographic checksum identifier of one block 142 in the metadata of another block 142, such that the former block 142 becomes the predecessor of the latter block 142. In this way, the blocks 142 form a chain that can be navigated from block-to-block by retrieving the cryptographic checksum of a particular block's predecessor from the particular block's own metadata. Each block 142 is computationally impractical to modify once it has been in the blockchain 140 because every block 142 after it would also have to be regenerated. These features protect data stored in the blockchain 140 from being modified by bad actors. Thus, these features improve the information security of the data stored in the blockchain 140.

The consensus module 158 is configured to establish a consensus among the blocks 142 about the present state of the distributed record 157 and the validity of the document 170. For example, the consensus module 158 may be executed by the processor 144 executing the software instructions 150 to implement a procedure through which all the blocks 142 of the blockchain network 140 reach a common agreement about the present state of the distributed record 157 and the validity of the document 170. In this way, consensus module 158 in each block 142 achieves reliability in the blockchain network 140 and establishes trust between the blocks 142 in a distributed computing environment. The consensus module 158 implements a consensus protocol to perform its operations. Essentially, the consensus protocol makes sure that every new block 142 that is added to the blockchain 140 is the one and only version of the truth that is agreed upon by all the blocks 142 in the blockchain 140. The consensus regarding the user information 180 indicates that a common agreement among the plurality of network nodes 130 and/or blocks 142 is reached that the user information 180 received from the plurality of network nodes 130 correspond to one another.

When a block 142 publishes an entry (e.g., a blockchain operation 159) in its blockchain record 157, the blockchain 140 for all other blocks 142 in the distributed network is also updated with the new entry. Thus, data published in a blockchain 140 is available and accessible to every block 142 with a blockchain record 157. This allows the data stored in the block 142 to be accessible for inspection and verification at any time by any device with a copy of the blockchain record 157.

Each of the blocks 142a-142n is an instance of a block 142. Each block 142 may comprise a processor 144 in signal communication with a memory 148 and a network interface 146. Processor 144 comprises one or more processors operably coupled to the memory 148. The processor 144 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 144 may be a programmable logic device, a microcontroller, a microprocessor, or any suitable combination of the preceding. The one or more processors are configured to process data and may be implemented in hardware or software. For example, the processor 144 may be 8-bit, 16-bit, 32-bit, 64-bit, or of any other suitable architecture. The processor 144 may include an arithmetic logic unit (ALU) for performing arithmetic and logic operations. The processor 144 may register the supply operands to the ALU and stores the results of ALU operations. The processor 144 may further include a control unit that fetches instructions from memory and executes them by directing the coordinated operations of the ALU, registers and other components. The one or more processors are configured to implement various software instructions. For example, the one or more processors are configured to execute software instructions 150 to perform one or more functions described herein. In this way, processor 144 may be a special-purpose computer designed to implement the functions disclosed herein. In an embodiment, the processor 144 is implemented using logic units, FPGAs, ASICs, DSPs, or any other suitable hardware. The processor 144 is configured to operate as described in FIGS. 1-5.

Network interface 146 is configured to enable wired and/or wireless communications (e.g., via network 110). The network interface 146 is configured to communicate data between the block 142 and other devices, computing devices 120, network nodes 130, verification device 160, other blocks 142, databases, systems, or domains. For example, the network interface 146 may comprise a WIFI interface, a local area network (LAN) interface, a wide area network (WAN) interface, a modem, a switch, or a router. The processor 144 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. The memory 148 may store any of the information described in FIGS. 1-5 along with any other data, instructions, logic, rules, or code operable to implement the function(s) described herein when executed by processors 144. The memory 148 is operable to store software instructions 150, previous block hash value 152, hash value 154, data 156, consensus module 158, blockchain record 157, and/or any other data and instructions. The data 156 may include timestamps of API requests 184, timestamps of API responses 178, timestamps of requests 106, timestamps for executing the blockchain operations 159, index of the block 142, etc. The hash value 154 may be used to uniquely identify the corresponding block 142. For example, the hash value 154 may include an alphanumerical string. The hash 152 of the previous block 142 may include a hash value 152 of the previous block 142 generated before the corresponding block 142. The order and place of the block 142 in the blockchain 140 may be determined by the hash 152 of the previous block 142. The software instructions 150 may comprise any suitable set of software instructions, logic, rules, or code operable to execute the processor 144 to perform the functions of the processor 144 and the block 142 described herein.

Each block 142 may include information derived from a preceding block 142. For example, every block 142 in the blockchain includes a hash 152 of the previous block 142. By including the hash 152 of the previous block 142, the blockchain network 140 includes a chain of blocks 142a to 142n from a genesis block 142a (or a block not shown to the left of the block 142a in the example of FIG. 1) to the latest block 142n (or a block not shown to the right of the block 142n in the example of FIG. 1). Each block 142 is guaranteed to come after the previous block 142 chronologically because the previous block's hash value 152 would otherwise not be known.

Verification Device

Verification device 160 is generally a hardware device that is configured to process data and communicate with other components of the system 100 via the network 110. The verification device 160 is further configured to provide services and software and/or hardware resources to computing devices 120, network nodes 130, and blockchain network 140. The verification device 16 is further configured to oversee the operations of the processor 162 as described further below and in conjunction with the operational flow 200 described in FIG. 2, the operational flow 300 described in FIG. 3, the method 400 described in FIG. 4, and the method 500 described in FIG. 5.

Processor 162 comprises one or more processors operably coupled to the memory 166. The processor 162 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 162 may be a programmable logic device, a microcontroller, a microprocessor, or any suitable combination of the preceding. The one or more processors are configured to process data and may be implemented in hardware or software. For example, the processor 162 may be 8-bit, 16-bit, 32-bit, 64-bit, or of any other suitable architecture. The processor 162 may include an ALU for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 168) to implement the processor 162. In this way, processor 162 may be a special-purpose computer designed to implement the functions disclosed herein. In an embodiment, the processor 162 is implemented using logic units, FPGAs, ASICs, DSPs, or any other suitable hardware. The processor 162 is configured to operate as described in FIGS. 1-5. For example, the processor 162 may be configured to perform one or more operations of methods 400 and 500 as described in FIGS. 4 and 5, respectively, and operations of operational flows 200 and 300 described in FIGS. 2 and 3, respectively.

Network interface 164 is configured to enable wired and/or wireless communications. The network interface 164 may be configured to communicate data between the verification device 160 and other devices, systems, or domains. For example, the network interface 164 may comprise an NFC interface, a Bluetooth interface, a Zigbee interface, a Z-wave interface, a radio-frequency identification (RFID) interface, a WIFI interface, a LAN interface, a WAN interface, a MAN interface, a PAN interface, a WPAN interface, a modem, a switch, and/or a router. The processor 162 may be configured to send and receive data using the network interface 164. The network interface 164 may be configured to use any suitable type of communication protocol.

The memory 166 may be volatile or non-volatile and may comprise read-only memory (ROM), random-access memory (RAM), ternary content-addressable memory (TCAM), dynamic random-access memory (DRAM), and static random-access memory (SRAM). The memory 166 may include one or more of a local database, cloud database, network-attached storage (NAS), etc. The memory 166 comprises one or more disks, tape drives, or solid-state drives, and may be used as an over-flow data storage device, to store programs when such programs are selected for execution, and to store instructions and data that are read during program execution. The memory 166 may store any of the information described in FIGS. 1-5 along with any other data, instructions, logic, rules, or code operable to implement the function(s) described herein when executed by processor 162. For example, the memory 166 may store software instructions 168, documents 170, scan/image 176 of documents 170, API responses 178, API requests 184, machine learning module 186, requests 106, user profiles 188, vectors 210a-b, threshold percentage 314, quantum computing module 190, log analyzer module 192, and/or any other data or instructions. The software instructions 168 may comprise any suitable set of instructions, logic, rules, or code operable to execute the processor 162 and perform the functions described herein, such as some or all of those described in FIGS. 1-5.

Machine learning module 186 may be implemented by the processor 162 executing the software instructions 168, and is generally configured to extract features from an image 176 of a document 170. In certain embodiments, the machine learning module 186 may include a support vector machine, neural network, random forest, k-means clustering, etc. In certain embodiments, the machine learning module 186 may be implemented by a plurality of neural network layers, convolutional neural network layers, Long-Short-Term-Memory (LSTM) layers, Bi-directional LSTM layers, recurrent neural network layers, and the like. In certain embodiments, the machine learning module 186 may include image processing, Optical Character Recognition (OCR) algorithm, text processing, text parsing, text analysis, natural language processing, or any other linguistic analysis algorithm. In certain embodiments, the machine learning module 186 may perform word tokenization, sentence tokenization, word segmentation, sentence segmentation, word-tagging, sentence tagging, word sequences, sentiment analysis, and/or any other linguistic pattern analysis.

The machine learning module 186 is configured to determine text, symbols, numbers, and/or any other information presented in the image 176 of a document 170. For example, the machine learning module 186 may determine user information 172 and other information 174 presented on the document 170. The document 170 may be a digital or a physical document. The document 170 may include user information 172 and other information 174. The user information 172 may include a name, an address, numbers (e.g., a profile number, an account number, a calendar date, and/or a serial number), text, and a signature associated with the user 102. The other information 174 may include an entity 132 associated with the document 170 and/or any other information. In certain embodiments, the document 170 may include a payment instrument. The quantum computing module 190 may be implemented by the processor 162 executing the software instructions 168, and is generally configured to perform one or more operation of the verification device 160, including detecting the malicious nodes 130 in the fault-tolerant system 100. The log analyzer module 192 may be implemented by the processor 162 executing the software instructions 168, and is generally configured to perform one or more operations of the verification device 160, including analyzing the log files 310a-d.

Example Operational Flow for Validating a Document

Figure 2:
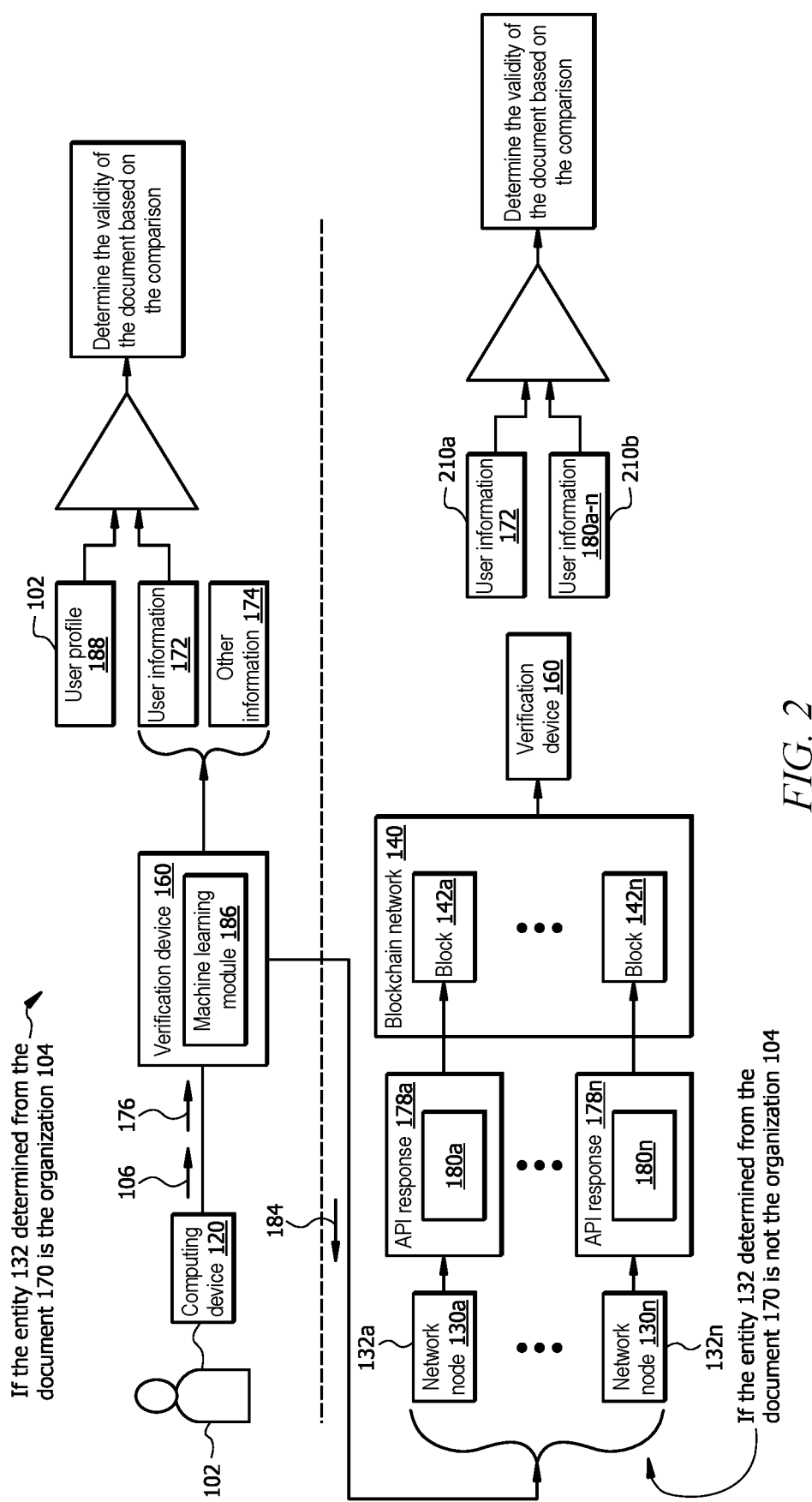
FIG. 2 illustrates an example operational flow of system of FIG. 1 for determining a validity of a document.

FIG. 2 illustrates an example operational flow 200 of system 100 of FIG. 1 for validating a document 170. Determining that the document 170 is valid may mean that the user information 174 on the document 170 is correct, associated with the correct user 102, and not tampered with by a bad actor.

The operational flow 200 may begin when the verification device 160 receives a scan or an image 176 of a document 170 from a computing device 120. The document 170 may be associated with a user 102. The image 176 may present the first user information 172 and other information 174. In certain embodiments, the verification device 160 may receive a request 106 indicating to determine the validity of the document 170 from a computing device 120. In certain embodiments, the verification device 160 may receive the request 106 through a block 142 (e.g., a request block 142).

The verification device 160 accesses the image 176 of the document 170. In certain embodiments, in response to accessing the image 176 of the document, the verification device 160 may generate a block 142 (e.g., a genesis block 142a) in the blockchain network 140 and store the request 106 and the first user information 172 (and the other information 174) in the block 142. In this manner, the verification device 160 may track the operations associated with the request 106 in the blockchain network 140.

Determining User Information Presented on the Document

The verification device 160 may feed the image 176 of the document 170 to the machine learning module 186 to extract the first user information 172 and the other information 174 from the image 176. In this process, the verification device 160 (via the machine learning module 186) may extract a set of features representing shapes, edges, and colors of information presented in the image 176 of the document 170. Based on the extracted set of features, the verification device 160 (via the machine learning module 186) determines the first user information 172 and the other information 174. In certain embodiments, the first user information 172 may be represented by a first vector 210a that comprises numerical values.

The verification device 160 may also identify an entity 132 associated with the document 170. For example, the verification device 160 may determine an identifier associated with an entity 132 that is presented on the document 170. The identifier associated with the entity 132 may be included in the other information 174. The identifier associated with the entity 132 may include a symbol, text, a title, and/or a name associated with the entity 132.

Determining the Validity of the Document Based on Information Received from an Entity In certain embodiments, if the entity 132 determined from the document 170 matches or corresponds to the organization 104, the verification device 160 may perform one or more operations below to determine the validity of the document 170.

The verification device 160 may perform a keyword search in the user profiles 188 to find a user profile 188 associated with the user 102. For example, the verification device 160 may search for a user profile 188 that is associated with the name of the user 102 that is determined from the image 176 of the document 170. In another example, the verification device 160 may search for a user profile 188 that is associated with the profile number of the user 102 that is determined from the image 176 of the document 170.

The verification device 160 finds the user profile 188 that is associated with the user 102. The user profile 188 may include a name, an address, numbers (e.g., an account number, a profile number, a calendar date of opening the account at the organization 104), and other information associated with the user 102, such as historical requests 106, historical activities associated with the user 102, etc.

The verification device 160 may compare each of the user information 172 (extracted from the document 170) with the counterpart information (determined from the user profile 188) previously stored in the user profile 188 associated with the user 102.

The verification device 160 may determine that validity of the document 170 based on the comparison between each of the user information 172 (extracted from the document 170) with the counterpart information (determined from the user profile 188) previously stored in the user profile 188 associated with the user 102. The verification device 160 may determine that the document 170 is valid if more than threshold number of components in the user information 172 (e.g., more than 99%, 95%, etc.) corresponds to counterpart components in the information determined from the user profile 188. Otherwise, the verification device 160 may determine that the document 170 is invalid.

In certain embodiments, if the entity 132 determined from the document 170 does not match or correspond to the organization 104, the verification device 160 may perform one or more operations below to determine the validity of the document 170.

The verification device 160 may communicate an API request 184 to a network node 130 (e.g., a computing device) associated with the entity 132 determined from the document 170. The API request 184 may indicate to provide second user information associated with the user 102, including a name, an address, numbers (e.g., account number, profile number, amount of resources, such as memory and/or processing resources), instructions, remarks, etc. In response, each network node 130 may transmit an API response 178 (directly or indirectly via a block 142) to the verification device 160. For example, the network node 130a may transmit the API response 178a, and the network node 130n may transmit the API request 184n.

The API response 178a may include the second user information 180a that includes a second name, a second address, second numbers (e.g., profile number, amount of resources, such as memory and/or processing resources), instructions, remarks, etc. associated with the user 102 based on historical interactions between the user 102 and the entity 132a. For example, the user 102 may have performed an operation, such as interacting with the entity 132a, opening an account at the entity 132a, filled out an online form on a website associated with the entity 132a, communicated with a user who is a member of, has an account with, or otherwise associated with the entity 132a, transferred files, documents, memory resources, and/or processing resources to the user who is associated with the entity 132a, and/or received files, documents, memory resources, and/or processing resources from the user who is associated with the entity 132a. Thus, the entity 132a may have the second user information 180a based on historical interaction of the user 102 with the entity 132a and/or a user associated with the entity 132a. The network node 130a may transmit the API response 178a (directly or indirectly via the block 142a) to the verification device 160.

The verification device 160 may compare each component in the first user information 172 with a countertop component in the second user information 180a. The verification device 160 determines a percentage of components in the first user information 172 that corresponds to the counterpart components in the second user information 180a.

The verification device 160 may determine the validity of the document 170 based at least on the comparison between the first user information 172 and the second user information 180a. In this process, the verification device 160 may determine whether the percentage of components in the first user information 174 that correspond to the counterpart components in the second user information 180a exceeds a threshold percentage (e.g., 90%, 95%, etc.). If the percentage of the components in the first user information 174 that corresponds to the counterpart components in the second user information 180a exceeds the threshold percentage, the verification device 160 may determine that the document is valid. Otherwise, the verification device 160 may determine that the document is invalid.

Determining the Validity of the Document Based on Information Received from Multiple Entities In certain embodiments, the verification device 160 may perform one or more operations below to determine the validity of the document 170 based on information received from multiple entities 132a-n. For example, the verification device 160 may communicate multiple API requests 184 to multiple network nodes 130a-n associated with entities 132a-n, respectively. Thus, the verification device 160 may receive multiple API responses 178a-n that include user information 180a-n, respectively. The verification device 160 may determine whether there is consensus among the network nodes 130a-n (and among the multiple received user information 180a-n) regarding the user information 180a-n. The consensus regarding the user information 180 indicates that a common agreement among the plurality of network nodes 130a-n and/or blocks 142a-n is reached that the user information 180a-n received from the plurality of network nodes 130a-n correspond to one another.

The verification device 160 may use this information to determine the validity of the document 170. For example, the verification device 160 may communicate the API request 184 to the network node 130n associated with the entity 132n. The API request 184 sent to the network node 130n may indicate to provide third user information 180n associated with the user 102, including a third name, a third address, third set of numbers (e.g., profile number, number of resources), instructions, remarks, etc. associated with the user 102 based on historical interactions between the user 102 and the entity 132n.

For example, the user 102 may have performed an operation, such as interacting with the entity 132n, opening an account at the entity 132n, filled out an online form on a website associated with the entity 132n, communicated with a user who is a member of, has an account with, or otherwise associated with the entity 132n in the past, transferred files, documents, memory resources, and/or processing resources to the user who is associated with the entity 132n, and/or received files, documents, memory resources, and/or processing resources from the user who is associated with the entity 132n. Thus, the entity 132n may have the second user information 180n based on historical interaction of the user 102 with the entity 132n and/or a user associated with the entity 132n.

To determine whether there is consensus between the network nodes 130a-n (and among the user information 180*a* and 180*n*), the verification device 160 may perform one or more operations below.

In general, the verification device 160 may determine whether the user information 180*a-n* match or correspond to each other. The network node 130*n* may transmit the API response 178*n* (directly or indirectly via the block 142*n*) to the verification device 160. The verification device 160 may receive the API response 178*n* that comprises third user information 180*n*. The third user information 180*n* may include a third name, a third address, third numbers (e.g., profile number, amount of resources, such as memory and/or processing resources), instructions, remarks, etc. associated with the user 102 based on historical interactions between the user 102 and the entity 132*n*.

The verification device 160 may compare each component in the third user information 180*n* with a counterpart component in the second user information 180*a*. The verification device 160 may determine a second percentage of components in the third user information 180*n* that corresponds to the counterpart components in the second user information 180*a*. The verification device 160 may compare the second percentage of components in the third user information 180*n* that corresponds to the counterpart components in the second user information 180*a* with a threshold percentage (e.g., 90%, 95%, etc.). The verification device 160 may determine that there is consensus between the second user information 180*a* and the third user information 180*n*, if it is determined that the second percentage of components in the third user information 180*n* that corresponds to the counterpart components in the second user information 180*a* exceeds the threshold percentage. In other words, the verification device 160 may determine that there is consensus between the network nodes 130*a* and 130*n* regarding the user information 180*a* and 180*n* associated with the user 102.

Similarly, the verification device 160 may determine whether there is consensus among the user information 180*a-n* received from network nodes 130*a-n*, and consequently among the network nodes 130*a-n* regarding the user information 180*a-n*. Similarly, the verification device 160 may determine whether there is consensus among the blocks 142*a-n* regarding the user information 180*a-n*.

In response to determining that there is consensus among the user information 180*a-n* and consequently among the network nodes 130*a-n* regarding the user information 180*a-n*, the verification device 160 may use any of the received user information 180*a-n* to compare with the user information 172 and determine the validity of the document 170 based on the comparison.

For example, assuming that the verification device 160 only receives user information 180*a* and 180*n*, in response to determining that there is consensus among the user information 180*a* and 180*n* and consequently among the network nodes 130*a* and 130*n* regarding the user information 180*a* and 180*n*, the verification device 160 may choose to use the third user information 180*n* with the first user information 172 and determine the validity of the document 170 based on this comparison. In this operation, the verification device 160 may compare each component in the third user information 170*n* with a counterpart component in the first user information 180*a*.

The verification device 160 may determine a percentage of components in the first user information 172 that corresponds to the counterpart components in the third user information 180*n*. The verification device 160 may compare the percentage of components in the first user information 172 that corresponds to the counterpart components in the third user information 180*n* with a threshold percentage (e.g., 90%, 95%, etc.). The verification device 160 may determine the validity of the document 170 based on the comparison between the first user information 172 and the third user information 180*n*.

In certain embodiments, the API responses 178*a-n* may be transmitted to blocks 142*a-n*, respectively. Each of the blocks 142*a-n* may be associated with an entity from entities 132*a-n*, respectively. The blockchain network 140 and/or the verification device 160 may determine whether there is consensus between the blocks 142*a-n* regarding the user information 180*a-n* (e.g., by implementing the consensus module 158) by comparing the user information 180*a-n* with one another, similar to that described above.

In certain embodiments, if it is determined that there is consensus between the blocks 142*a-n* regarding the user information 180*a-n*, the verification device 160 may proceed to selecting one of the user information 180*a-n* and comparing the selected user information 180 with the user information 172. The verification device 160 may determine the validity of the document 170 based on the comparison between the user information 172 and the selected user information 180.

In certain embodiments, in response to determining the validity of the document 170, the verification device 160 may generate a new block 142 in the distributed blockchain network 140 and indicate the validity of the document 170 in the newly generated block 142 (e.g., in the blockchain record 157 as a blockchain operation 159).

In certain embodiments, determining the validity of the document 170 may include one or more operations below. The verification device 160 may compare the first user information 174 with the second user information 180 (e.g., one of the user information 180*a-n*).

The verification device 160 (via the machine learning module 186) determines the first user information 172, similar to that described above. The first user information 172 may be represented by a first vector 210*a* of numerical values. For example, the output of the processing the image 176 of the document 170 by the machine learning module 186 may be the first vector 210*a* that is an embedding that represents the user information 172.

Similarly, the verification device 160 may extract the second user information 180 from the API response 178. For example, the verification device 160 may feed the API response 178 (e.g., a text file that includes the second user information 180) to the machine learning module 186. The machine learning module 186 may extract the second user information 180 from the API response 178. The second user information 180 may be represented by a second vector 210*b* of numerical values.

The verification device 160 (e.g., via the machine learning module 186) may compare the first vector 210*a* with the second vector 210*b*. In certain embodiments, the verification device 160 (e.g., via the machine learning module 186) may perform a dot product between the first vector 210*a* and the second vector 210*b* to determine the similarities between the vectors 210*a* and 210*b*.

The verification device 160 (e.g., via the machine learning module 186) may determine a Euclidean distance between the vectors 210*a* and 210*b*. If the Euclidian distance between the vectors 210*a* and 210*b* is less than a threshold percentage (e.g., less than 1%, 2%, etc.), the verification device 160 (e.g., via the machine learning module 186) may determine that the vector 210*a* matches or corresponds to the vector 210*b*, and in turn, the user information 172 matches or corresponds to the user information 180. In response, the verification device 160 may determine that the document 170 is valid. Otherwise, the verification device 160 may determine that the document 170 is invalid.

In certain embodiments, the verification device 160 (e.g., via the machine learning module 186) may determine the similarity between the vectors 210*a* and 210*b* as below. The verification device 160 (e.g., via the machine learning module 186) may determine a percentage of numerical values in the first vector 210*a* that corresponds to the counterpart numerical value in the second vector 210*b*. The verification device 160 (e.g., via the machine learning module 186) may compare the percentage of numerical values in the first vector 210*a* that corresponds to the counterpart numerical value in the second vector 210*b* to a threshold percentage (e.g., 90%, 95%, etc.).

The verification device 160 (e.g., via the machine learning module 186) may determine whether the percentage of numerical values in the first vector 210*a* that corresponds to the counterpart numerical value in the second vector 210*b* exceeds the threshold percentage.

If the percentage of numerical values in the first vector 210*a* that corresponds to the counterpart numerical value in the second vector 210*b* exceeds the threshold percentage, the verification device 160 may determine that the vector 210*a* matches or corresponds to the vector 210*b*, and in turn, determine that the user information 172 matches or corresponds to the user information 180. In response, the verification device 160 may determine that the document 170 is valid. Otherwise, the verification device 160 may determine that the document 170 is invalid.

In certain embodiments, in response to determining that the document 170 is valid, the verification device 160 may perform one or more operations. For example, in case the document 170 is a payment instrument, the amount on the document 170 is transferred to the payee indicated on the document 170. In another example, an amount of requested resources may be transferred to a recipient indicated on the document 170. In another example, a request indicated by the user 102 on the document 170 may be granted by the verification device 160.

Example Operational Flow for Detecting Malicious Network Nodes

Figure 3:
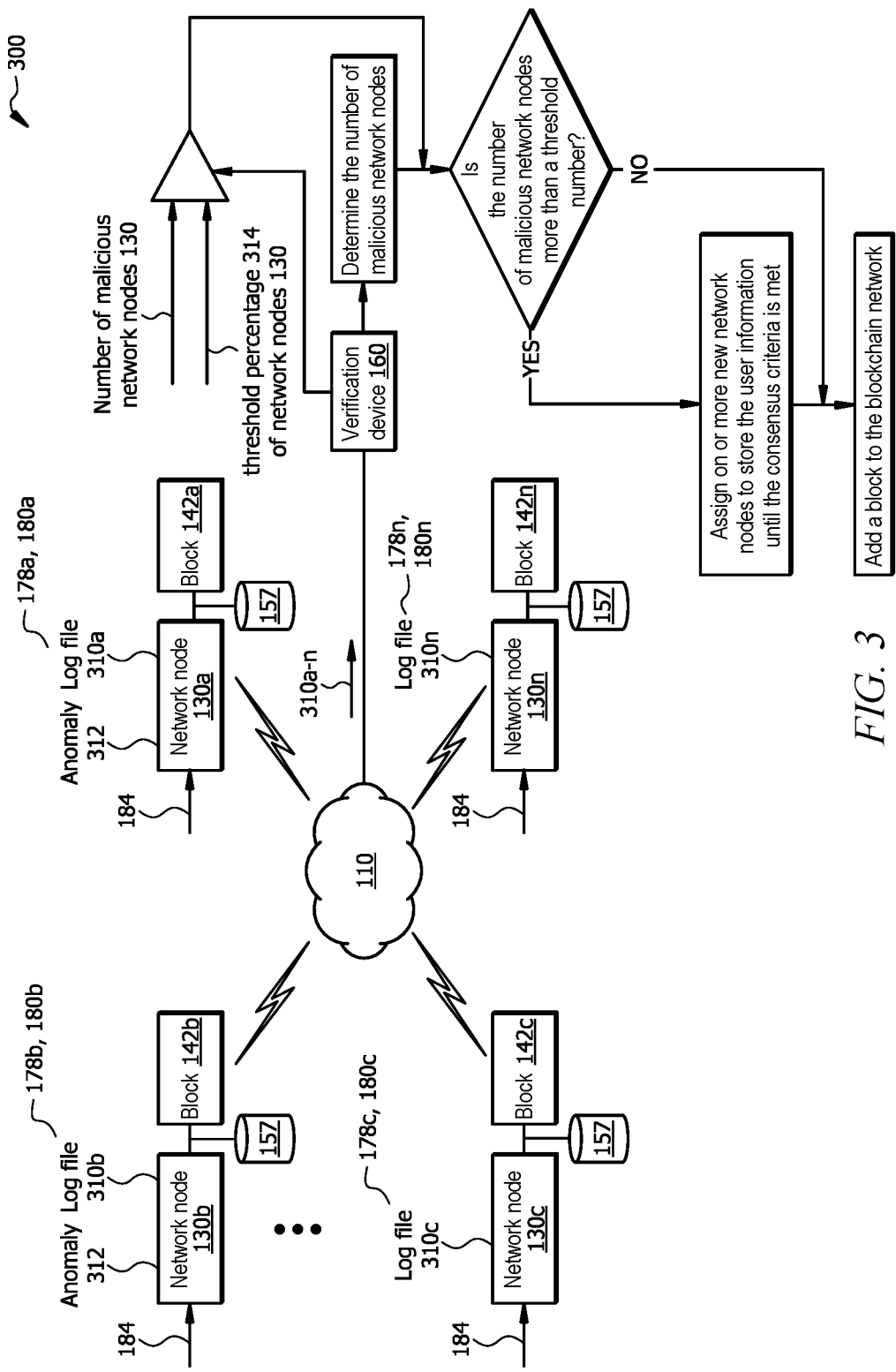
FIG. 3 illustrates an example operational flow of the system of FIG. 1 for detecting malicious network nodes.

FIG. 3 illustrated an example operational flow 300 of system 100 of FIG. 1 for implementing a fault-tolerant system 100 (see FIG. 1) for detecting malicious network nodes and establishing consensus among network nodes 130 regarding the validity of the user information 172 and/or 180.

As described in FIGS. 1 and 2, to determine the validity of the user information 172 on a document 170, the verification device 160 may transmit API requests 184 to network nodes 130*a-n* within a distributed network to provide user information associated with the document 170.

In the illustrated embodiment, the verification device 160 transmits API request 184 to the network nodes 130*a-n*. The network node 130*a* may transmit log file 310*a* to the verification device 160. In certain embodiments, the network node 130*a* may transmit the log file 310*a* to the verification device 160 via the block 142*a*. For example, the network node 130*a* may transmit the log file 310*a* to the block 142*a*, the block 142*a* may store the log file 310*a* in the blockchain record 157. The block 142*a* and/or the network node 130*a* may use the log file 310*a* to perform any operation described herein. The log file 310*a* may include data communication between the network nodes 130*a* and other network nodes 130, blocks 142, systems, devices, servers, databases in the system 100. The log file 310*a* may also include an API response 178*a* of the network node 130*a* to the API request 184. The API response 178*a* may include the user information 180*a* that the network node 130*a* has about the user 102 (see FIG. 2).

The network node 130*b* may transmit log file 310*b* to the verification device 160. In certain embodiments, the network node 130*b* may transmit the log file 310*b* to the verification device 160 via the block 142*b*. For example, the network node 130*b* may transmit the log file 310*b* to the block 142*b*, the block 142*b* may store the log file 310*b* in the blockchain record 157. The block 142*b* and/or the network node 130*b* may use the log file 310*b* to perform any operation described herein. The log file 310*b* may include data communication between the network nodes 130*b* and other network nodes 130, blocks 142, systems, devices, servers, databases, in the system 100. The log file 310*b* may also include an API response 178*b* of the network node 130*b* to the API request 184. The API response 178*b* may include the user information 180*b* that the network node 130*b* has about the user 102 (see FIG. 2).

The network node 130*c* may transmit log file 310*c* to the verification device 160. In certain embodiments, the network node 130*c* may transmit the log file 310*c* to the verification device 160 via the block 142*c*. For example, the network node 130*c* may transmit the log file 310*c* to the block 142*c*, the block 142*c* may store the log file 310*c* in the blockchain record 157. The block 142*c* and/or the network node 130*c* may use the log file 310*c* to perform any operation described herein. The log file 310*c* may include data communication between the network nodes 130*c* and other network nodes 130, blocks 142, systems, devices, servers, databases, in the system 100. The log file 310*c* may also include an API response 178*c* of the network node 130*c* to the API request 184. The API response 178*c* may include the user information 180*c* that the network node 130*c* has about the user 102 (see FIG. 2).

The network node 130*n* may transmit log file 310*n* to the verification device 160. In certain embodiments, the network node 130*n* may transmit the log file 310*n* to the verification device 160 via the block 142*n*. For example, the network node 130*n* may transmit the log file 310*n* to the block 142*n*, the block 142*n* may store the log file 310*n* in the blockchain record 157. The block 142*n* and/or the network node 130*n* may use the log file 310*n* to perform any operation described herein. The log file 310*n* may include data communication between the network nodes 130*n* and other network nodes 130, blocks 142, systems, devices, servers, databases, in the system 100. The log file 310*n* may also include an API response 178*n* of the network node 130*n* to the API request 184. The API response 178*n* may include the user information 180*n* that the network node 130*n* has about the user 102 (see FIG. 2).

Determining Whether a Network Node is a Malicious Network Node

In certain embodiments, the verification device 160 may determine whether each of the network nodes 130*a-n* is associated with an anomaly 312, i.e., whether each of the network nodes 130*a-n* is a malicious network node 130.

In certain embodiments, an anomaly 312 may indicate that a network node 130 is unresponsive to the API request 184. For example, the verification device 160 may transmit the API request 184 to a network node 130*a* and expect to receive the API response 178*a* (see FIG. 2) within a threshold time period (e.g., within five seconds, ten seconds, etc.). If the verification device 160 does not receive the API response 178*a* (see FIG. 2) within the threshold time period, the verification device 160 determines that the network node 130a is associated with an anomaly 312.

In certain embodiments, an anomaly 312 may indicate that the consensus regarding the user information 174 is not met among the network nodes 130a-n. For example, the anomaly 312 associated with the network node 130b may be in response to determining that at least a subset of components in the received user information 180b is missing in the API response 178b received from the network node 130b. In this particular example, due to the missing components in the user information 180b, the consensus regarding the user information 174 may not be met because all the components in the user information 180b may be needed to be compared with counterpart components of the user information 174, similar to that described in FIG. 2. In another example, an anomaly 312 associated with the network node 130b may be in response to determining that the received user information 180b includes incorrect information about the user 102 that does not correspond to the counterpart component in the user information 174 and/or the other user information 180 received from other network nodes 130.

In certain embodiments, an anomaly 312 may indicate that a network node 130 and/or a block 142 associated with the network node 130 is malfunctioning or otherwise is not operational. For example, an anomaly 312 associated with the network node 130a may be in response to determining that the verification device 160 does not receive a response to an acknowledgement message to the network node 130a.

In certain embodiments, an anomaly 312 may be due to an unauthorized access (e.g., by a bad actor via cyberattacks or other code hacks) to a network node 130a and/or a block 142.

The verification device 160 may use this information to determine the number of malicious network nodes 130. In this process, the verification device 160 receives a plurality of log files 310a-n from the network nodes 130a-n, respectively, similar to that described above. The log files 310a-n include data communication among the network nodes 130a-n and API responses 178a-n.

The verification device 160 determine a number of network nodes 130 that are associated with one or more anomalies 312. For example, the verification device 160 determines a first number of network nodes 130 that are associated with a first anomaly 312 from the log files 310a-n. For example, the first anomaly 312 may include an indication that a network node 130 is unresponsive to the API request 184. In other examples, the first anomaly 312 may be any of the example embodiment anomalies 312 described herein. In another example, the verification device 160 determines a second number of network nodes 130 that are associated with a second anomaly 312. The second anomaly 312 may include an indication that the consensus regarding the user information 180 and/or 174 is not met among the network nodes 130a-n and/or among the blocks 142a-n. In this particular example, the verification device 160 may perform one or more operations described in the operational flow 200 of FIG. 2, such as comparing the user information 174 with the user information 180a-n, and determining if the any of the user information 180a-n does not match the user information 174. For example, if it is determined that the user information 180b does not match or correspond to the user information 174 (and/or the rest of the user information a, c, and n), the verification device 160 determines that the network node 130b and/or the block 142b is associated with an anomaly 312. The second number of network nodes 130 may or may not overlap with the first number of network nodes 130.

In certain embodiments, the verification device 160 may determine other subsets or numbers of network nodes 130 that are associated with one or more anomalies 312. The verification device 160 may determine a number of malicious network nodes 130 by combining the number of network nodes 130 that are associated with anomalies 312. Continuing the examples above, the verification device 160 may determine the number of malicious network nodes 130 by combining the first number of network nodes 130 associated with the first anomaly 312 and the second number of network nodes 130 associated with the second anomaly 312.

The verification device 160 compares the number of malicious network nodes 130 with a threshold percentage 314 of network nodes 130. The threshold percentage 314 of the network nodes 130 may be the minimum required number of network nodes 130 that is needed to establish the consensus regarding the user information 180 and/or 174 among the network nodes 130 and/or the blocks 142. The threshold percentage 314 of the network nodes 130 may be 30%, 35%, or any other suitable value.

The verification device 160 determines whether the number of malicious network nodes 130 exceeds the threshold percentage 314. If the verification device 160 determines that the number of malicious network nodes 130 exceeds the threshold percentage 314, the verification device 160 determines that the consensus among the network nodes 130 and/or among the blocks 142 regarding the user information 180 and/or 174 is not met.

In response, the verification device 160 may assign one or more new network nodes 130 in the distributed network to store the user information 174 (or the correct user information 180 determined based on the consensus between the network nodes 130) until the number of malicious network nodes 130 is less than the threshold percentage 314.

In other words, the verification device 160 may assign one or more new network nodes 130 to store the user information 174 (or the correct user information 180) until the consensus criteria among the network nodes 130 (and consequently among the blocks 142) is met. The consensus criteria may indicate that in order for the consensus regarding the user information 180 to be met between the network nodes 130, the number of malicious network nodes 130 (that are associated with anomalies 312) should be less than the threshold percentage 314 of the network nodes 130.

In this process, the verification device 160 may detect which network node 130 (associated with a particular entity 132) is associated with an anomaly 312 and assign another network node 130 associated with the particular entity 132 to the store the user information 174 (or the correct user information 180). For example, assume that the verification device 160 determines that the network node 130a is associated with a first anomaly 312. The network node 130a is associated with the entity 132a as described in FIG. 1. In this example, the verification device 160 may assign a second network node 130 associated with the entity 132a to store the user information 174 (or the correct user information 180).

In a particular example, assume that the verification device 160 determines that the network node 130a is associated with a first anomaly 312. The network node 130a may be a WAN server associated with the entity 132a. In this example, the verification device 160 may assign a second network node 130 associated with the entity 132a to store the user information 174 (or the correct user information 180). The second network node 130 may be a LAN server associated with the entity 132a.

For example, assume that the verification device 160 determines that the network node 130b is associated with a second anomaly 312. The network node 130b is associated with the entity 132b as described in FIG. 1. In this example, the verification device 160 may assign a second network node 130 associated with the entity 132b to store the user information 174 (or the correct user information 180).

In a particular example, assume that the verification device 160 determines that the network node 130b is associated with a second anomaly 312. The network node 130b may be a WAN server associated with the entity 132b. In this example, the verification device 160 may assign a second network node 130 associated with the entity 132b to store the user information 174 (or the correct user information 180). The second network node 130 may be a LAN server associated with the entity 132b.

In certain embodiments, if the verification device 160 determines that the number of malicious network nodes 130 is less than the threshold percentage 314, the verification device 160 may add a block 142 to the blockchain network 140. The new block 142 may store a particular blockchain operation 162 (see FIG. 1). In response, the verification device 160 may perform the particular blockchain operation 162. The particular blockchain operation 162 may be in response to determining that the document 170 is valid. For example, performing the particular blockchain operation 162 may include granting a request indicate by the user 102 on the document 170 by the verification device 160. Other examples of the operation of the verification device 160 in response to determining that the document 170 is valid are described in FIG. 2.

In certain embodiments, if the verification device 160 determines that the number of malicious network nodes 130 is more than the threshold percentage 314, the verification device 160 may add a block 142 to the blockchain network 140. The new block 142 may store a particular blockchain operation 162 that indicates that the document 170 is determined to be invalid. In response, the request indicated on the document 170 may be denied by the verification device 160.

Example Method for Validating a Document

Figure 4:
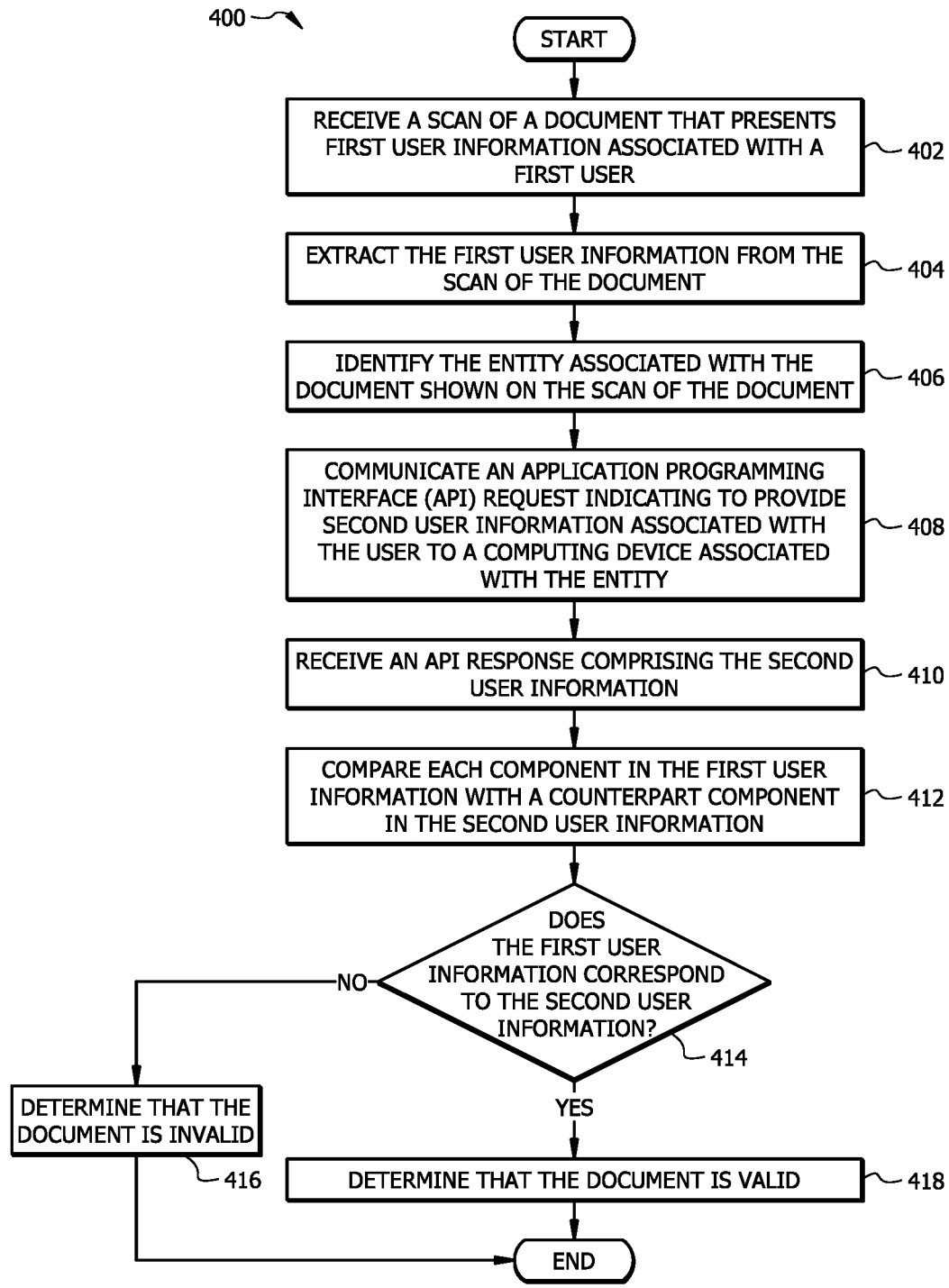
FIG. 4 illustrates an example flowchart of a method for determining a validity of a document.

FIG. 4 illustrates an example flowchart of a method 400 for validating a document 170. Modifications, additions, or omissions may be made to method 400. Method 400 may include more, fewer, or other operations. For example, operations may be performed in parallel or in any suitable order. While at times discussed as the system 100, verification device 160, or components of any of thereof performing operations, any suitable system or components of the system may perform one or more operations of the method 400. For example, one or more operations of method 400 may be implemented, at least in part, in the form of software instructions 168 of FIG. 1, stored on non-transitory, tangible, machine-readable media (e.g., memory 166 of FIG. 1) that when run by one or more processors (e.g., processor 162 of FIG. 1) may cause the one or more processors to perform operations 402-418.

At operation 402, the verification device 160 receives a scan 176 of a document 170 that presents first user information 172 associated with a user 102. The scan 176 may be or include an image 176 of the document 170. For example, the verification device 160 may receive the scan 176 from the computing device 120, similar to that described in FIG. 2. The scan and/or image 176 may also present other information 174.

At operation 404, the verification device 160 extracts the first user information 172 from the scan and/or image 176 of the document 170. In this process, the verification device 160 may feed the scan 176 to the machine learning module 186 to extract the first user information 172, similar to that described in FIG. 2. Similarly, the verification device 160 may extract the other information 174.

At operation 406, the verification device 160 identifies the entity (e.g., entity 132 or organization 104) associated with the document 170 shown on the scan 176 of the document 170. For example, the verification device 160 may detect the identifier associated with the entity shown on the scan 176 of the document 170, similar to that described in FIG. 2.

At operation 408, the verification device 160 communicates an API request 184 indicating to provide second user information 180 associated with the user 102 to a computing device (e.g., network node 130) associated with the entity 132.

At operation 410, the verification device 160 receives an API response 178 from the computing device (e.g., network node 130) associated with the entity 132, similar to that described in FIG. 4. At operation 412, the verification device 160 compares each component in the first user information 174 with a counterpart component in the second user information 180. The components in the first user information 174 comprise at least one of the first name, the first address, and the first number associated with the user 102. The components in the second user information 180 comprise at least one of the second name, the second address, and second number associated with the user 102. For example, the verification device 160 may implement the machine learning module 186 to perform this comparison. For example, the verification device 160 may extract a first set of features from the first user information 174 that is represented in the first vector 210a, extract a second set of features from the second user information 180 that is represented in the second vector 210b, and compare the first vector 210a with the second vector 210b, similar to that described in FIG. 2.

At operation 414, the verification device 160 determines whether the first user information 174 corresponds to the second user information 180. For example, the verification device 160 may determine whether the first user information 174 corresponds to the second user information 180 based on the comparison between the vectors 210a and 210b, similar to that described in FIG. 2. If the verification device 160 determines that the first user information 174 corresponds to the second user information 180, method 400 proceeds to 418. Otherwise, method 400 proceeds to 416. At operation 416, the verification device 160 determines that the document 170 is not valid. At operation 418, the verification device 160 determines that the document 170 is valid.

Example Method for Detecting Malicious Network Nodes

Figure 5:
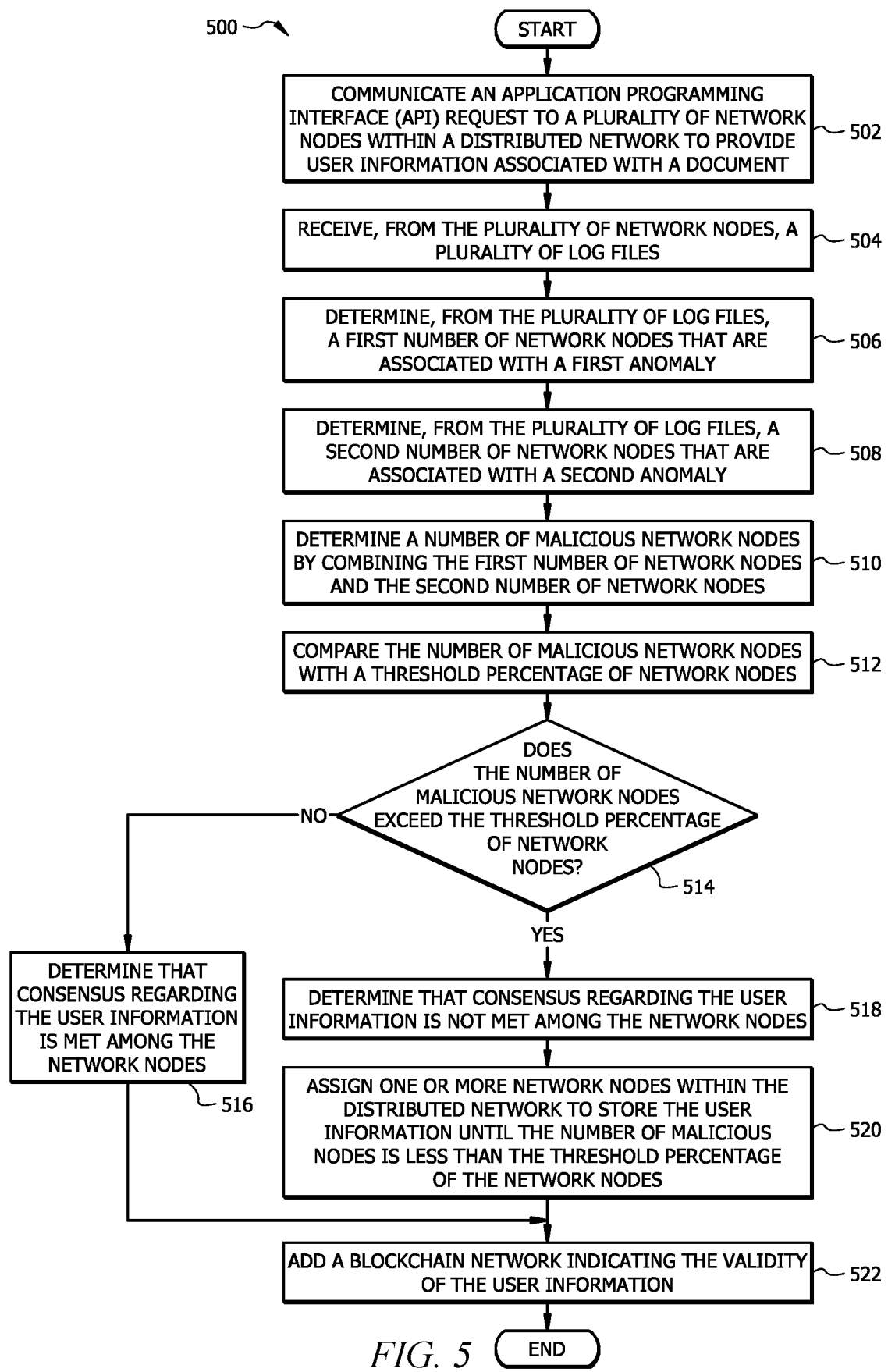
FIG. 5 illustrates an example flowchart of a method for detecting malicious network nodes.

FIG. 5 illustrates an example flowchart of a method 500 for detecting malicious network nodes 130 and establishing consensus among network nodes 130 regarding the validity of a document 170. Modifications, additions, or omissions may be made to method 500. Method 500 may include more, fewer, or other operations. For example, operations may be performed in parallel or in any suitable order. While at times discussed as the system 100, verification device 160, or components of any of thereof performing operations, any suitable system or components of the system may perform one or more operations of the method 500. For example, one or more operations of method 500 may be implemented, at least in part, in the form of software instructions 168 of FIG. 1, stored on non-transitory, tangible, machine-readable media (e.g., memory 166 of FIG. 1) that when run by one or more processors (e.g., processor 162 of FIG. 1) may cause the one or more processors to perform operations 502-522.

At operation 502, the verification device 160 communicates an API request 184 to a plurality of network nodes 130 (e.g., network nodes 130*a-n* in FIG. 3) within a distributed network to provide user information associated with a user 102.

At operation 504, the verification device 160 receives, from the plurality of network nodes 130, a plurality of log files 310 (e.g., log files 310*a-n* in FIG. 3). The log files 310 may include data communication between the network nodes 130 and the API responses 178 which include the user information 180.

At operation 506, the verification device 160 determines, from the plurality of log files 310, a first number of network nodes 130 that are associated with a first anomaly 312. Examples of the anomaly 312 are described in FIG. 3. For example, the verification device 160 determines the first number of network nodes 130 through quantum computing enabled log analyzer 192 and declarative mapping between anomalies 312 and network nodes 130.

At operation 508, the verification device 160 determines, from the plurality of log files 310, a second number of network nodes 130 that are associated with a second anomaly 312. Examples of the anomaly 312 are described in FIG. 3. Similarly, the verification device 160 may determine a number of network nodes 130 that are associated with one or more anomalies 312, similar to that described in FIG. 3. For example, the verification device 160 determines the second number of network nodes 130 through quantum computing enabled log analyzer 192 and declarative mapping between anomalies 312 and network nodes 130.

At operation 510, the verification device 160 determines a number of malicious network nodes 130 by combining the first number of network nodes 130 and the second number of network nodes 130. Similarly, the verification device 160 may determine the number of malicious network nodes 130 by combining the numbers of network nodes 130 associated with one or more anomalies 312.

At operation 512, the verification device 160 compares the number of malicious network nodes 130 with a threshold percentage 314 of the network nodes 130. At operation 514, the verification device 160 determines whether the number of malicious network nodes 130 exceeds the threshold percentage 314 of the network nodes 130. If the verification device 160 determines that the number of malicious network nodes 130 exceeds the threshold percentage 314, method 500 proceeds to 518. Otherwise, method 500 proceeds to 516.

At operation 516, the verification device 160 determines that the consensus regarding the user information 180 and/or 174 is met among the network nodes 130. For example, the verification device 160 compares the user information 180*a-n* received from the network nodes 130*a-n* and determines whether they correspond to one another. If the user information 180*a-n* correspond to one another, the verification device 160 determines that the consensus regarding the user information 180 and/or 174 is met among the network nodes 130. In another example, when the number of malicious network nodes 130 is less than the threshold percentage 314 and the verification device 160 determines that the user information 180 received from the non-malicious network nodes 130 correspond to one another, the verification device 160 determines that the consensus regarding the user information 180 and/or 174 is met among the network nodes 130.

At operation 518, the verification device 160 determines that the consensus regarding the user information 180 and/or 174 is not met among the network nodes 130. For example, the verification device 160 compares the user information 180*a-n* received from the network nodes 130*a-n* and determines whether they correspond to one another. If more than a threshold number of the user information 180*a-n* (e.g., more than 50%, 60%, etc.) does not correspond to one another, the verification device 160 determines that the consensus regarding the user information 180 and/or 174 is not met among the network nodes 130.

In another example, when the number of malicious network nodes 130 is less than the threshold percentage 314 and the verification device 160 determines that more than a threshold number of the user information 180 (e.g., more than 50%, 60%, etc.) received from the non-malicious network nodes 130 do not correspond to one another, the verification device 160 determines that the consensus regarding the user information 180 and/or 174 is not met among the network nodes 130.

In another example, when the number of malicious network nodes 130 is less than the threshold percentage 314 and the verification device 160 determines that more than a threshold number of the user information 180 (e.g., more than 50%, 60%, etc.) received from the non-malicious network nodes 130 do not correspond to one another, the verification device 160 determines that the consensus regarding the user information 180 and/or 174 is not met among the network nodes 130.

In another example, when the number of malicious network nodes 130 is more than the threshold percentage 314 and the verification device 160 determines that more than a threshold number of the user information 180 (e.g., more than 50%, 60%, etc.) received from the non-malicious network nodes 130 correspond to one another, the verification device 160 may determine that the consensus regarding the user information 180 and/or 174 is not met among the network nodes 130.

In another example, when the number of malicious network nodes 130 is more than the threshold percentage 314, the verification device 160 may determine that the consensus regarding the user information 180 and/or 175 is not met, whether or not the user information 180 received from non-malicious network nodes 130 correspond to one another.

At operation 520, the verification device 160 assigns one or more network nodes 130 within the distributed network to store the user information 180 or user information 174 (that is determined to be the correct user information based on the consensus among the network nodes 130 and comparison between the existing record of the user 102 and the user information 174 on the document 170) until the number of malicious network nodes 130 is less than the threshold percentage 314 of the network nodes 130, similar to that described in FIG. 3. For example, the verification device 160 replicates one or more trusted network nodes 130 within the distributed network to store the user information 180 or user information 174 through quantum computing until the number of malicious nodes 130 is less than the threshold percentage 314.

At operation 522, the verification device 160 adds a block 142 to the blockchain network 140 indicating the validity of the user information 180 and/or 174, similar to that described in FIG. 3.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A fault-tolerant system for establishing consensus among network nodes within a distributed network, comprising:
    a network interface configured to communicate a request to a plurality of network nodes within a distributed network to provide user information associated with a document, wherein the user information comprises at least one of a name, an address, and a serial number associated with a user;
    a processor operably coupled with the network interface, and configured to:
        receive, from the plurality of network nodes, a plurality of log files, wherein the plurality of log files comprises data communications among the plurality of network nodes and responses to the request;
        determine, from the plurality of log files, a first number of network nodes from among the plurality of network nodes that are associated with a first anomaly, wherein the first anomaly comprises an indication that a network node is unresponsive to the request;
        determine, from the plurality of log files, a second number of network nodes from among the plurality of network nodes that are associated with a second anomaly, wherein:
            the second anomaly comprises an indication that a consensus regarding the user information is not met among the plurality of network nodes; and
            the consensus regarding the user information indicates that a common agreement among the plurality of network nodes is reached that the user information received from the plurality of network nodes correspond to one another;
        determine a number of malicious network nodes by combining the first number of network nodes and the second number of network nodes;
        compare the number of malicious network nodes with a threshold percentage of network nodes, wherein the threshold percentage of network nodes is a minimum required number of network nodes that is needed to establish the consensus regarding the user information among the plurality of network nodes;
        determine that the number of malicious network nodes exceeds the threshold percentage of network nodes;
        in response to determining that the number of malicious network nodes exceeds the threshold percentage of network nodes:
            determine that the consensus regarding the user information is not met; and
            assign one or more new network nodes within the distributed network to store the user information until the number of malicious network nodes is less than the threshold percentage of network nodes.

2. The fault-tolerant system of claim 1, wherein:
the document is associated with a first entity;
the plurality of network nodes is associated with a plurality of entities; and
each of the plurality of network nodes is associated with a different entity from among the plurality of entities.

3. The fault-tolerant system of claim 2, wherein the processor is further configured to, in response to determining that the number of malicious network nodes exceeds the threshold percentage of network nodes:
    determine that a first network node associated with a second entity from among the plurality of entities is associated with the first anomaly; and
    assign a second network node associated with the second entity to store the user information.

4. The fault-tolerant system of claim 2, wherein the processor is further configured to, in response to determining that the number of malicious network nodes exceeds the threshold percentage of network nodes:
    determine that a third network node associated with a third entity from among the plurality of entities is associated with the second anomaly; and
    assign a fourth network node associated with the third entity to store the user information.

5. The fault-tolerant system of claim 1, wherein the second anomaly associated with a second network node is in response to determining that at least a subset of components in received user information is missing in a response received from the second network node.

6. The fault-tolerant system of claim 1, wherein the processor is further configured to determine that consensus regarding the user information among the plurality of network nodes is met when at least the threshold percentage of network nodes have provided the responses comprising the user information that correspond to one another.

7. A method for establishing consensus among network nodes within a distributed network, comprising:
    communicating a request to a plurality of network nodes within a distributed network to provide user information associated with a document, wherein the user information comprises at least one of a name, an address, and a serial number associated with a user;
    receiving, from the plurality of network nodes, a plurality of log files, wherein the plurality of log files comprises data communications among the plurality of network nodes and responses to the request;
    determining, from the plurality of log files, a first number of network nodes from among the plurality of network nodes that are associated with a first anomaly, wherein the first anomaly comprises an indication that a network node is unresponsive to the request;

determining, from the plurality of log files, a second number of network nodes from among the plurality of network nodes that are associated with a second anomaly, wherein:
- the second anomaly comprises an indication that a consensus regarding the user information is not met among the plurality of network nodes; and
- the consensus regarding the user information indicates that a common agreement among the plurality of network nodes is reached that the user information received from the plurality of network nodes correspond to one another;

determining a number of malicious network nodes by combining the first number of network nodes and the second number of network nodes;

comparing the number of malicious network nodes with a threshold percentage of network nodes, wherein the threshold percentage of network nodes is a minimum required number of network nodes that is needed to establish the consensus regarding the user information among the plurality of network nodes;

determining that the number of malicious network nodes exceeds the threshold percentage of network nodes;

in response to determining that the number of malicious network nodes exceeds the threshold percentage of network nodes:
- determining that the consensus regarding the user information is not met; and
- assigning one or more new network nodes within the distributed network to store the user information until the number of malicious network nodes is less than the threshold percentage of network nodes.

8. The method of claim 7, wherein:
the document is associated with a first entity;
the plurality of network nodes is associated with a plurality of entities; and
each of the plurality of network nodes is associated with a different entity from among the plurality of entities.

9. The method of claim 8, further comprising, in response to determining that the number of malicious network nodes exceeds the threshold percentage of network nodes:
- determining that a first network node associated with a second entity from among the plurality of entities is associated with the first anomaly; and
- assigning a second network node associated with the second entity to store the user information.

10. The method of claim 8, further comprising, in response to determining that the number of malicious network nodes exceeds the threshold percentage of network nodes:
- determining that a third network node associated with a third entity from among the plurality of entities is associated with the second anomaly; and
- assigning a fourth network node associated with the third entity to store the user information.

11. The method of claim 7, wherein the second anomaly associated with a second network node is in response to determining that at least a subset of components in received user information is missing in a response received from the second network node.

12. The method of claim 7, further comprising determining that consensus regarding the user information among the plurality of network nodes is met when at least the threshold percentage of network nodes have provided the responses comprising the user information that correspond to one another.

13. A non-transitory computer-readable medium that stores instructions, wherein when the instructions are executed by one or more processors, cause the one or more processors to:
- communicate a request to a plurality of network nodes within a distributed network to provide user information associated with a document, wherein the user information comprises at least one of a name, an address, and a serial number associated with a user;
- receive, from the plurality of network nodes, a plurality of log files, wherein the plurality of log files comprises data communications among the plurality of network nodes and responses to the request;
- determine, from the plurality of log files, a first number of network nodes from among the plurality of network nodes that are associated with a first anomaly, wherein the first anomaly comprises an indication that a network node is unresponsive to the request;
- determine, from the plurality of log files, a second number of network nodes from among the plurality of network nodes that are associated with a second anomaly, wherein:
  - the second anomaly comprises an indication that a consensus regarding the user information is not met among the plurality of network nodes; and
  - the consensus regarding the user information indicates that a common agreement among the plurality of network nodes is reached that the user information received from the plurality of network nodes correspond to one another;
- determine a number of malicious network nodes by combining the first number of network nodes and the second number of network nodes;
- compare the number of malicious network nodes with a threshold percentage of network nodes, wherein the threshold percentage of network nodes is a minimum required number of network nodes that is needed to establish the consensus regarding the user information among the plurality of network nodes;
- determine that the number of malicious network nodes exceeds the threshold percentage of network nodes;
- in response to determining that the number of malicious network nodes exceeds the threshold percentage of network nodes:
  - determine that the consensus regarding the user information is not met; and
  - assign one or more new network nodes within the distributed network to store the user information until the number of malicious network nodes is less than the threshold percentage of network nodes.

14. The non-transitory computer-readable medium of claim 13, wherein:
the document is associated with a first entity;
the plurality of network nodes is associated with a plurality of entities; and
each of the plurality of network nodes is associated with a different entity from among the plurality of entities.

15. The non-transitory computer-readable medium of claim 14, wherein the one or more processors are further configured to, in response to determining that the number of malicious network nodes exceeds the threshold percentage of network nodes:
- determine that a first network node associated with a second entity from among the plurality of entities is associated with the first anomaly; and
- assign a second network node associated with the second entity to store the user information.

16. The non-transitory computer-readable medium of claim 14, wherein the instructions when executed by the one or more processors, further cause the one or more processors to, in response to determining that the number of malicious network nodes exceeds the threshold percentage of network nodes:
- determine that a third network node associated with a third entity from among the plurality of entities is associated with the second anomaly; and
- assign a fourth network node associated with the third entity to store the user information.

17. The non-transitory computer-readable medium of claim 13, wherein the second anomaly associated with a second network node is in response to determining that at least a subset of components in received user information is missing in a response received from the second network node.

* * * * *